US00RE48071E

(19) United States
(12) Reissued Patent
Sakuma

(10) Patent Number: US RE48,071 E
(45) Date of Reissued Patent: Jun. 30, 2020

(54) LIQUID CRYSTAL MODULE WITH TOP-CUT CONICAL SUPPORTS ON THE BACKLIGHT CHASSIS

(71) Applicant: Funai Electric Co., Ltd., Osaka (JP)
(72) Inventor: Kota Sakuma, Daito (JP)
(73) Assignee: Funai Electric Co., LTD., Osaka (JP)

(21) Appl. No.: 15/430,229
(22) Filed: Feb. 10, 2017
Related U.S. Patent Documents
Reissue of:
(64) Patent No.: 7,430,026
Issued: Sep. 30, 2008
Appl. No.: 11/353,858
Filed: Feb. 14, 2006

(30) Foreign Application Priority Data

Feb. 15, 2005 (JP) ..... P2005-037382

(51) Int. Cl.
*G02F 1/1333* (2006.01)
*G02F 1/13357* (2006.01)
(52) U.S. Cl.
CPC .. *G02F 1/133608* (2013.01); *G02F 1/133604* (2013.01); *G02F 2201/46* (2013.01)
(58) Field of Classification Search
CPC ..... G02F 1/1333; G02F 1/13357; G02F 1/133608
USPC ..... 349/58–60
See application file for complete search history.

(56) References Cited

U.S. PATENT DOCUMENTS 7,204,604 B2 * 4/2007 Chou ..... F21K 9/00 362/227
7,275,852 B2 * 10/2007 Kim ..... G02F 1/133608 362/609
7,436,467 B2 * 10/2008 Lee ..... G02F 1/13452 349/149
7,679,696 B2 * 3/2010 Makino ..... G02F 1/133308 349/155
2004/0179151 A1 * 9/2004 Lee ..... 349/58

FOREIGN PATENT DOCUMENTS

JP 2004-287120 10/2004

OTHER PUBLICATIONS

English Patent Abstract of JP2004287120 from esp@cenet, published Oct. 14, 2004, 1 page.

* cited by examiner

*Primary Examiner* — Henry N Tran
(74) *Attorney, Agent, or Firm* — Osha Liang LLP

(57) ABSTRACT

A liquid crystal module includes: a rectangular-frame-shaped mold frame that is provided with a backlight therein; a liquid crystal cell that is arranged on a front face of the mold frame and is illuminated from a rear side by the backlight; a backlight chassis that is made of metal and fixed on a rear face of the backlight via a reflecting sheet made of synthetic resin; a plurality of supports that are formed on the backlight chassis; and a circuit board that is fixed to the supports by screwing, wherein the support is formed in a top-cut conical shape by swelling the backlight chassis backward by being subjected to drawing.

21 Claims, 9 Drawing Sheets

LIQUID CRYSTAL MODULE WITH TOP-CUT CONICAL SUPPORTS ON THE BACKLIGHT CHASSIS

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

BACKGROUND OF THE INVENTION

1. Field

The present invention relates to an economical liquid crystal module used for a television set or a monitor for personal computer use characterized in that: the number of parts is small and the machining does not cost much labor.

2. Description of the Related Art

A conventional liquid crystal module is disclosed in JP-2004-287120. An example of the conventional liquid crystal module will be explained referring to FIGS. 6 to 11. This is a desktop type television set. In the housing 1 which is composed of a front panel 1a and a rear cover 1b, the rectangular-frame-shaped mold frame 2 is arranged. Inside the mold frame 2, the backlight 3 is provided. On the front face of the mold frame 2, the liquid crystal cells 4 are arranged. On the rear face of the backlight 3, the backlight chassis 6 made of metal is fixed via the reflecting sheet 5 made of white synthetic resin, so that the liquid crystal cells 4 can be illuminated from the rear side by the backlight 3. In this connection, reference numeral 7 is a diffusion plate, reference numeral 8 is a bezel, and reference numeral 9 is a support rod.

As shown in FIG. 7, the backlight chassis 6 includes: a rectangular-plate-shaped chassis body 6a; a pair of side plates 6b which are bent at right angles from both side edges of the chassis body 6a; and four leg plates 6c which are bent from both end portions of the side plates 6b at right angles. The backlight chassis 6 is engaged with the rear cover 1b and the mold frame 2 via the engaging holes 10 of the leg plates 6c.

As shown in FIG. 8, a plurality of top-cut conical supports 11 (shown in FIG. 9), which are formed by means of drawing, and a plurality of substantially L-shaped supports 12 (shown in FIG. 10), which are bent backward by means of raising, are formed on the chassis body 6a at predetermined intervals. Idle end portions of appropriate substantially L-shaped supports 12 (three supports 12 in this case) are bent into a substantially L-shape so that two side edge positioning protrusion pieces 13a, 13b and one lower edge positioning protrusion piece 13c can be formed (shown in FIG. 11). The lower edge positioning protrusion piece 13d, the face of which is on the same face as that of the lower edge positioning protrusion piece 13c, is formed by raising the chassis body 6a (shown in FIG. 7). The main circuit board 15 is made to come into contact with the positioning protrusion pieces 13a to 13d and put on the supports 11, 12. When the screws 17 are screwed into the screw holes 16 of the supports 11, 12 via the main circuit board 15, the main circuit board 15 is fixed to a reverse face of the backlight chassis 6.

The digital circuit board 18 is also fixed to the reverse face of the backlight chassis 6 by the same procedure. Therefore, like reference characters are used to indicate like parts and the description of the procedure of fixing the digital circuit board 18 is omitted here.

According to the conventional structure, in order to fix the main circuit board 15 to the backlight chassis 6, both drawing and raising are conducted upon the chassis body 6a of the backlight chassis 6 so as to form the supports 11, 12 of a plurality of types, which takes time and much labor and increases the manufacturing cost.

Since a large number of cutout holes 20 are formed on the chassis body 6a of the backlight chassis 6 by raising, a ray of light G transmitted through the reflecting sheet 5 passes through the cutout holes 20 and the ventilation hole 21 (shown in FIG. 6) of the rear cover 1b and leaks out backward.

In order to solve the above problems, as shown in FIGS. 10 and 11, the cutout holes 20 are closed with the shading sheet 22. When this countermeasure is taken, the number of parts is increased by using the shading sheet 22. Further, when this shading sheet 22 is stuck, it takes much labor and the manufacturing cost is increased.

SUMMARY OF THE INVENTION

The present invention provides an economical liquid crystal module characterized in that: the number of parts is small; and the machining does not cost much labor.

A liquid crystal module including: a rectangular-frame-shaped mold frame that is provided with a backlight therein; a liquid crystal cell that is arranged on a front face of the mold frame and is illuminated from a rear side by the backlight; a backlight chassis that is made of metal and fixed on a rear face of the backlight via a reflecting sheet made of synthetic resin; a plurality of supports that are formed on the backlight chassis; and a circuit board that is fixed to the supports by screwing, wherein the support is formed in a top-cut conical shape by swelling the backlight chassis backward by being subjected to drawing, wherein the supports are grouped into one of a first support and a second support, wherein the first support is formed with a positioning cylindrical portion protruding outward at a top face center thereof, wherein the second support is formed with a fixing cylindrical portion protruding inward at a top face center thereof by burring, wherein the positioning cylindrical portion and the fixing cylindrical portion are provided with a screw hole on an inner circumferential face thereon, and wherein the circuit board is fixed to a reverse face of the backlight chassis by positioning the circuit board by engaging the positioning cylindrical portion to a through-hole formed on the circuit board to concentrically positioning the through-hole to the screw hole, and by screwing a screw into the screw hole.

A liquid crystal module including: a rectangular-frame-shaped mold frame that is provided with a backlight therein; a liquid crystal cell that is arranged on a front face of the mold frame and is illuminated from a rear side by the backlight; a backlight chassis that is made of metal and fixed on a rear face of the backlight via a reflecting sheet made of synthetic resin; a plurality of supports that are formed on the backlight chassis; and a circuit board that is fixed to the supports by screwing, wherein the support is formed in a top-cut conical shape by swelling the backlight chassis backward by being subjected to drawing.

DETAILED DESCRIPTION

Figure 1:
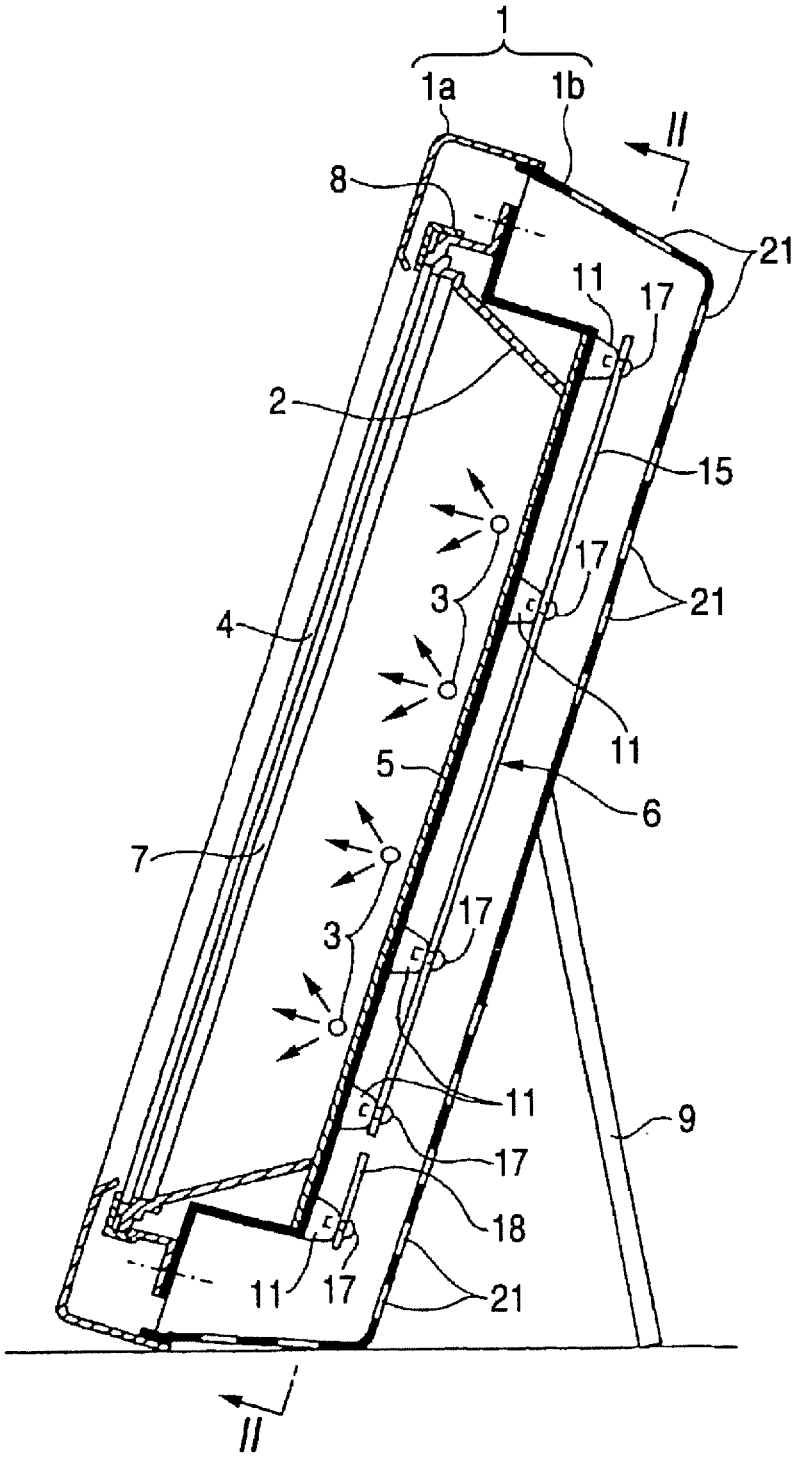
FIG. 1 is a longitudinal sectional view showing a liquid crystal module which is an embodiment of the present invention.
Figure 2:
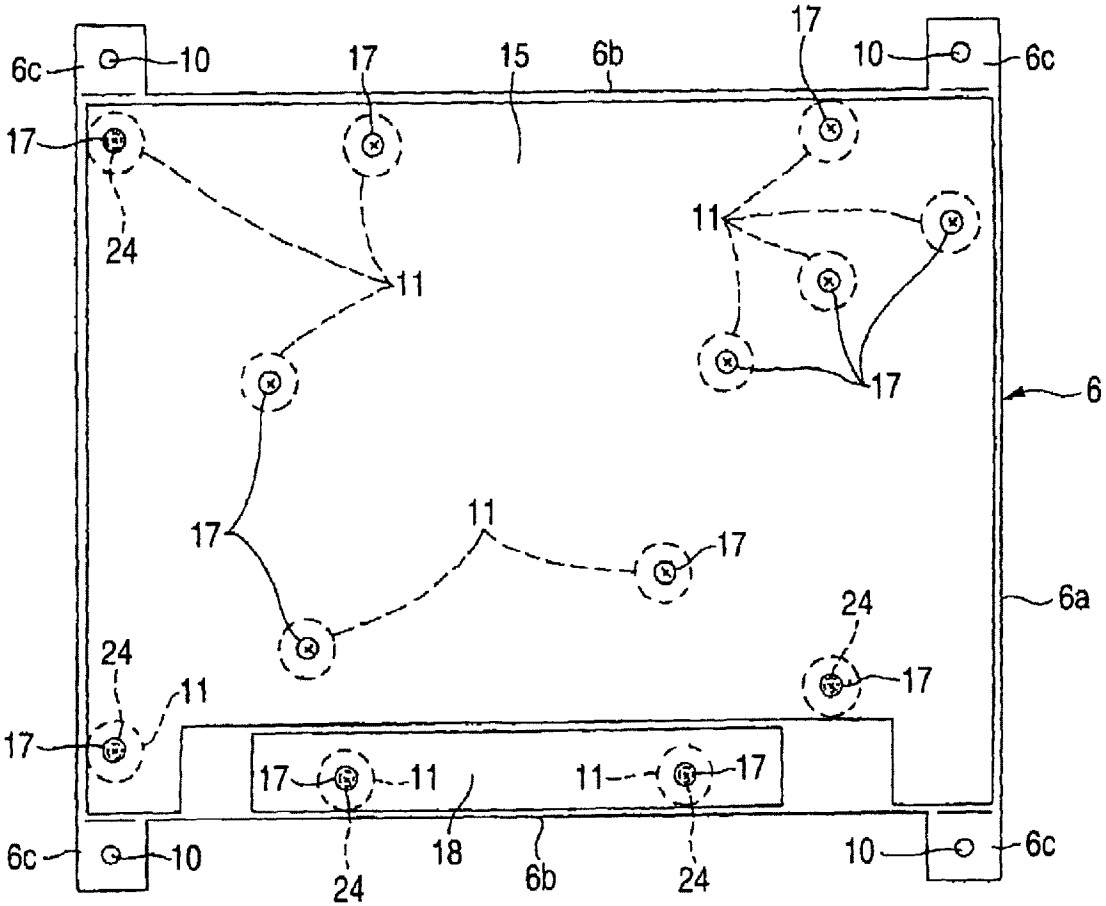
FIG. 2 is a view taken on line II-II in FIG. 1.
Figure 3:
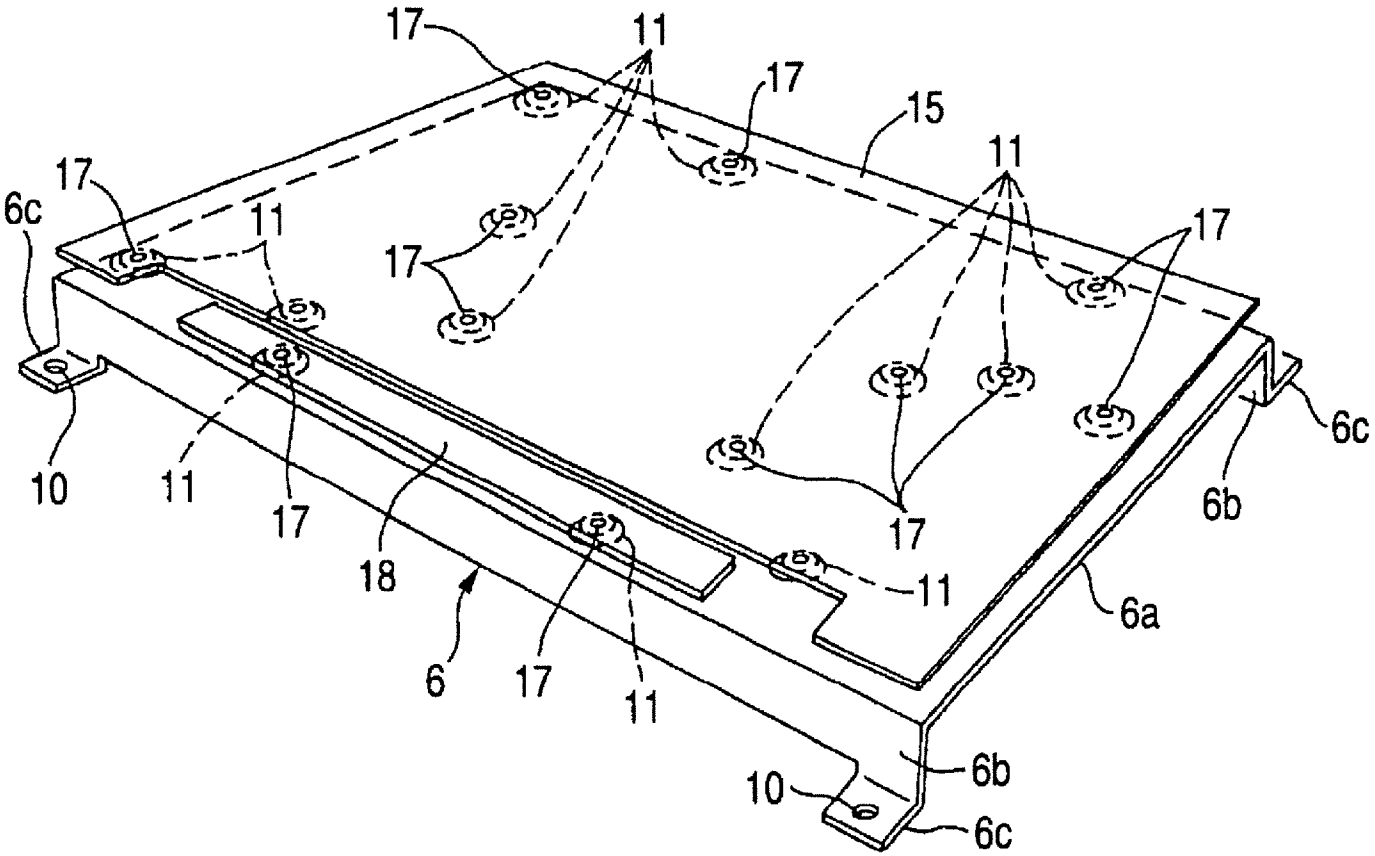
FIG. 3 is a perspective view showing the liquid crystal module.

Now referring to the drawings, an explanation will he given of an embodiment of the viewing limitation setting method according to this invention.

FIGS. 1-5B are views showing a desktop type television set (liquid crystal module) which is an embodiment of the present invention. Instead of the substantially L-shaped supports 12 which are conventionally formed on the backlight chassis 6, the top-cut conical supports 11 are formed in this embodiment. Since the structure except for that is substantially the same as the structure shown in FIGS. 6 to 11, like reference characters are used to indicate like parts and the explanations are omitted here.

Figure 4A:
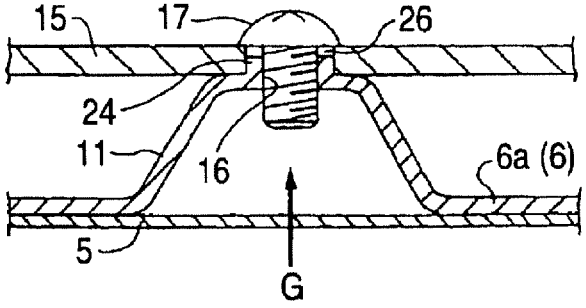
FIG. 4A is an enlarged longitudinal sectional view of a primary portion of the liquid crystal module.
Figure 4B:
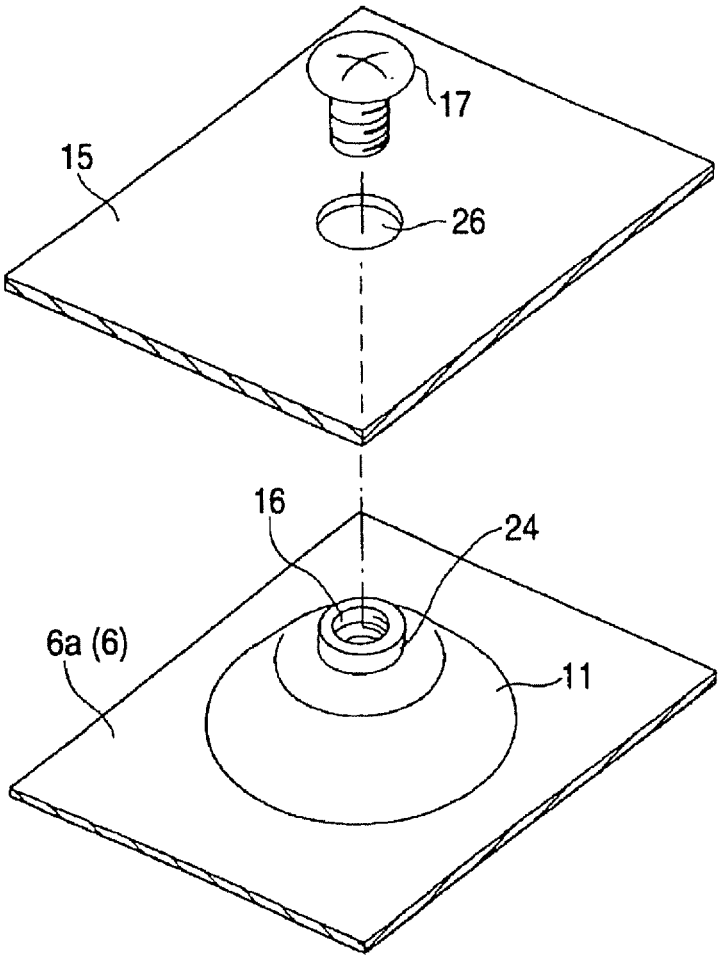
FIG. 4B is an enlarged perspective view of the primary portion of the liquid crystal module.
Figure 5A:
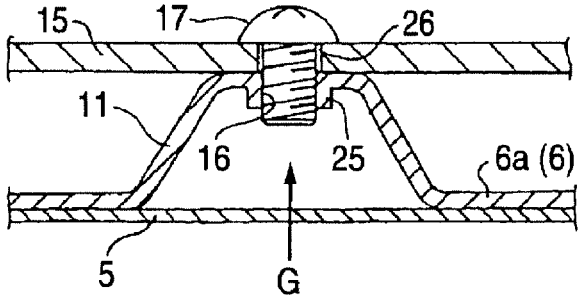
FIG. 5A is an enlarged longitudinal sectional view of another primary portion of the liquid crystal module.
Figure 5B:
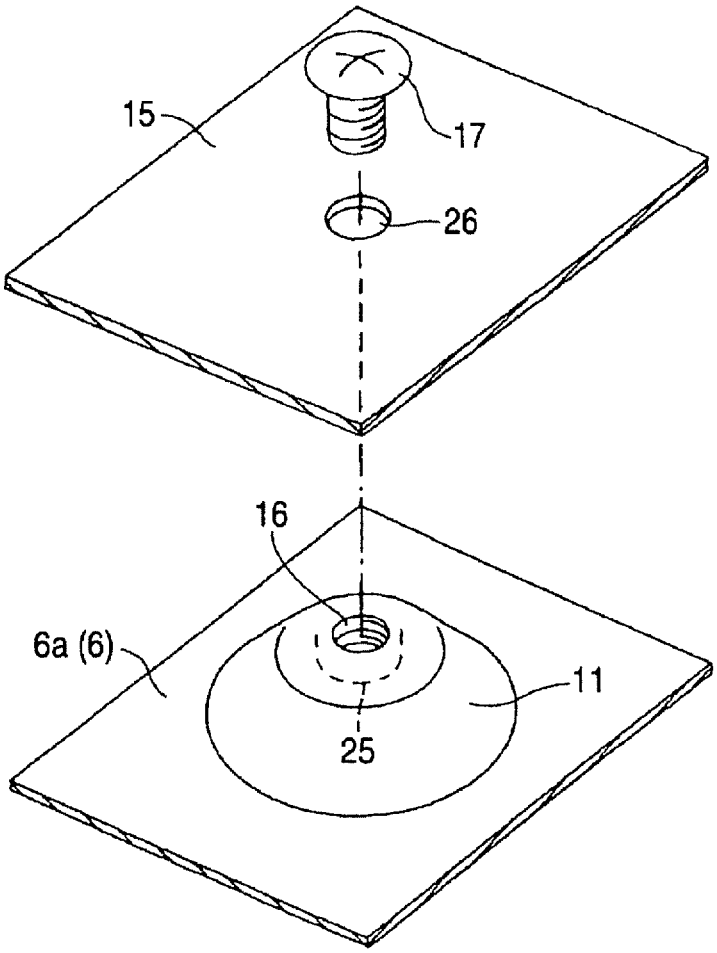
FIG. 5B is an enlarged perspective view of another primary portion of the liquid crystal module.
Figure 6:
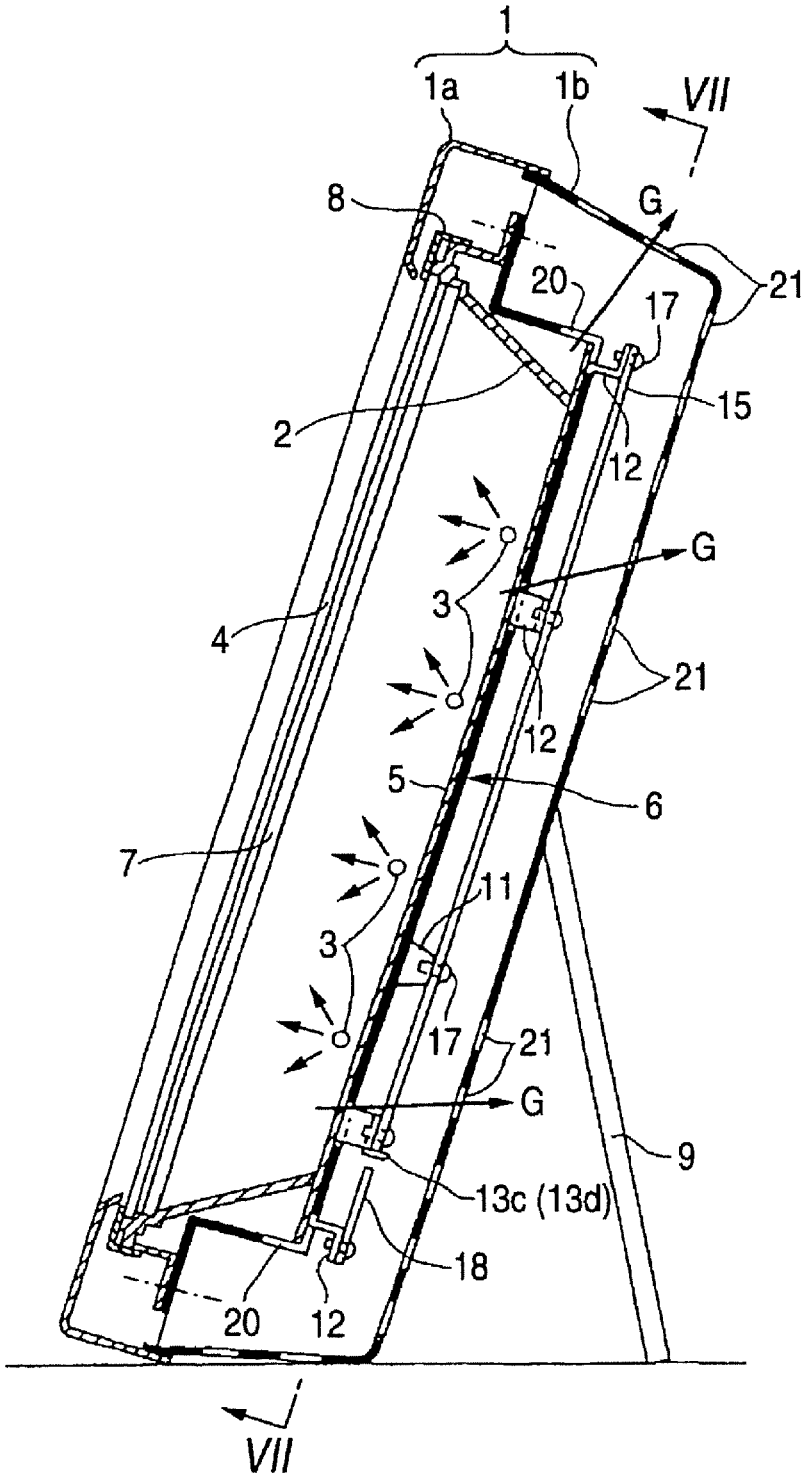
FIG. 6 is a longitudinal sectional view showing a conventional example.
Figure 7:
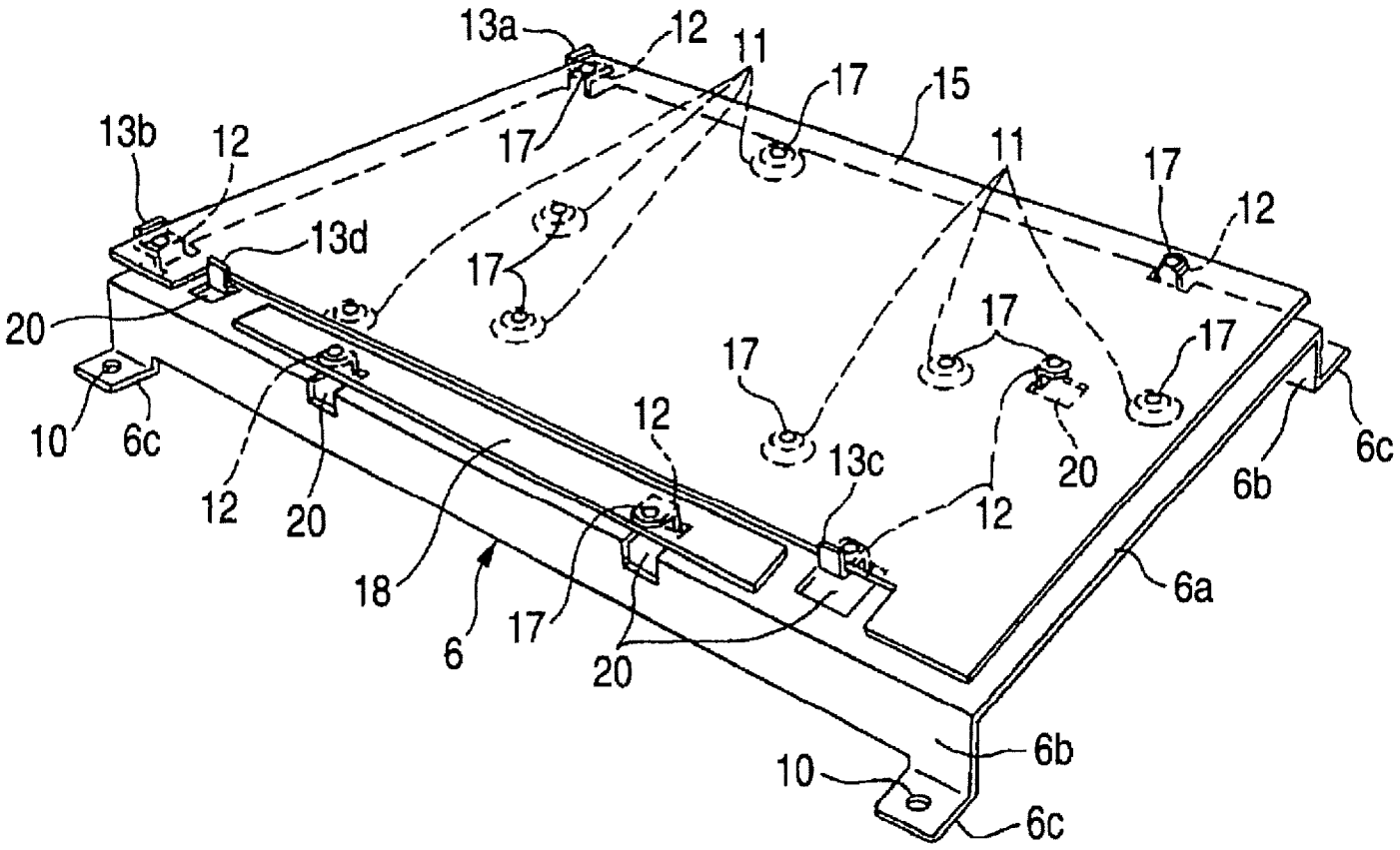
FIG. 7 is a view taken on line VII-VII in FIG. 6.
Figure 8:
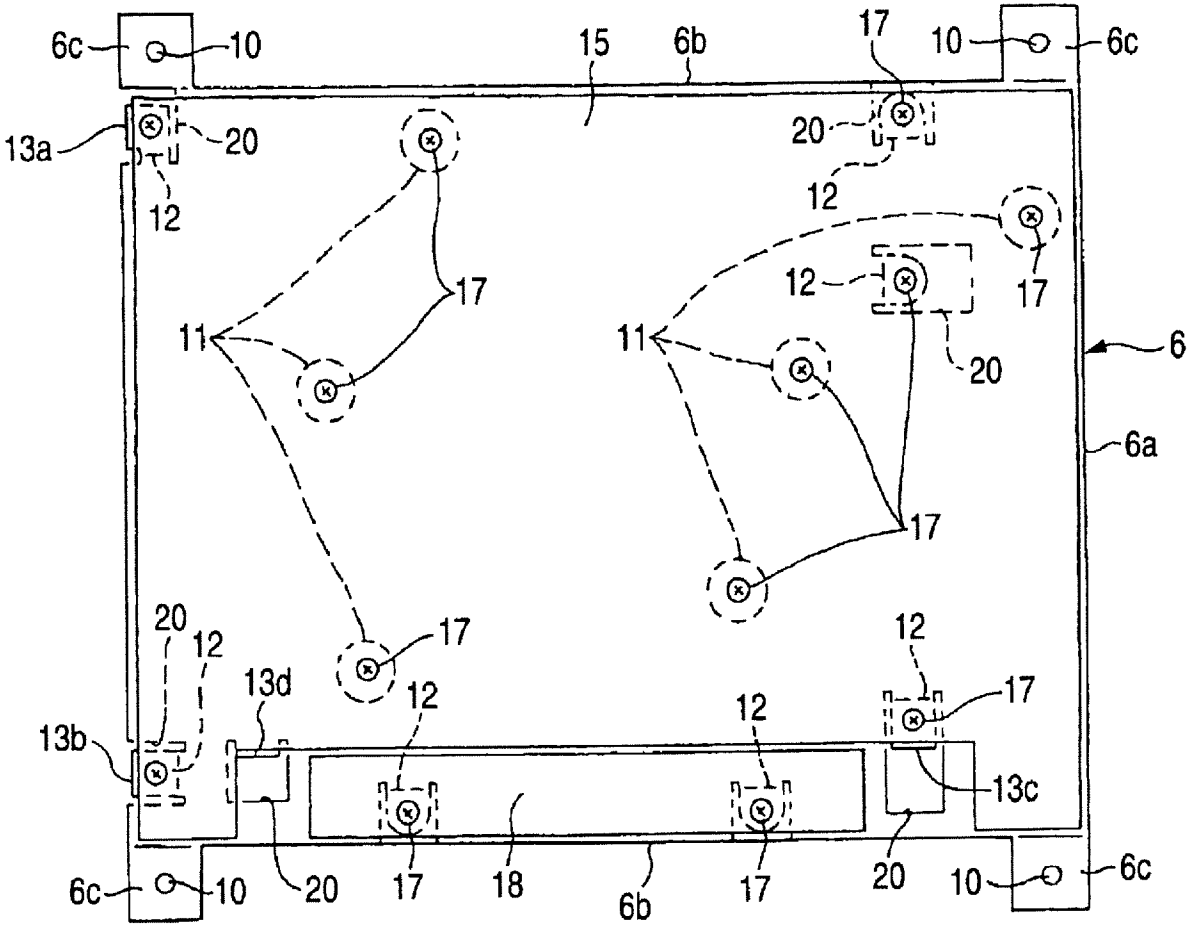
FIG. 8 is a perspective view of the conventional example.
Figure 9:
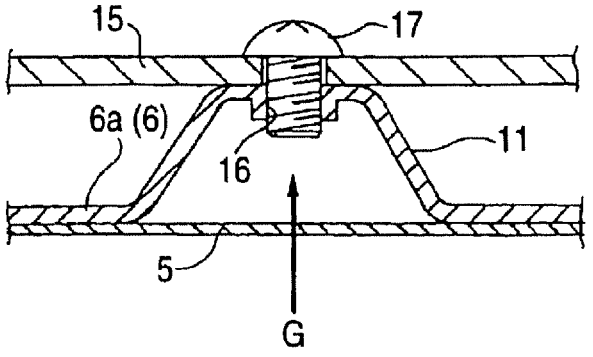
FIG. 9 is an enlarged longitudinal sectional view of a primary portion of the conventional example.
Figure 10:
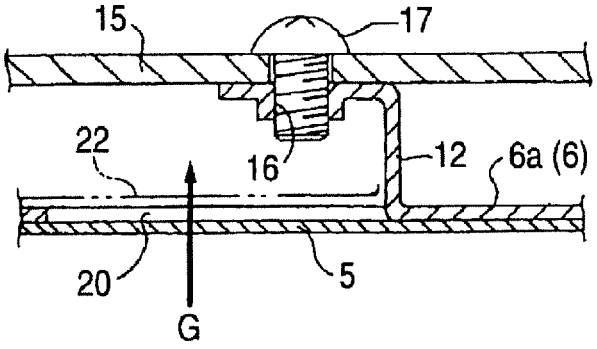
FIG. 10 is an enlarged sectional view of another primary portion of the conventional example.
Figure 11:
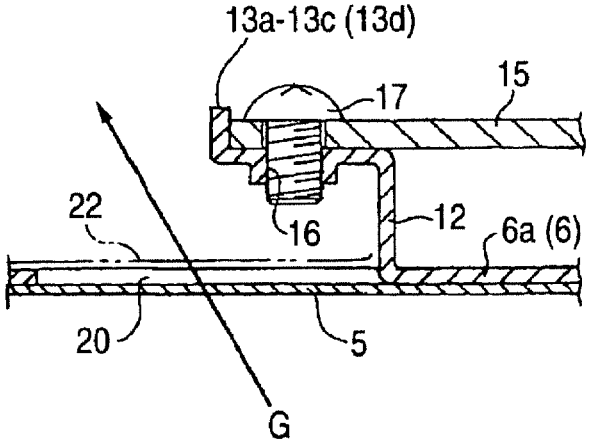
FIG. 11 is an enlarged sectional view of still another primary portion of the conventional example.

Each top-cut conical support 11 is the same as that shown in FIG. 9 and formed when the backlight chassis 6 is subjected to drawing so that the top-cut conical support 11 can be swelled backward. At the top face centers of appropriate supports 11 (three supports 11 corresponding to the left upper corner, the left lower corner and the right lower corner of the main circuit board 15 shown in FIG. 2 in this case), as shown in FIGS. 4A and 4B, the positioning cylindrical portions 24, which protrude outward; are formed by means of burring, and as shown in FIGS. 5A and 5B, at the top face centers of the supports 11 except for the appropriate supports, the fixing cylindrical portions 25, which protrude inward, are formed by burring. On the inner circumferential face of each cylindrical portion 24, 25, the screw hole 16 is formed.

The procedure of fixing the main circuit hoard 15 will he explained as follows. When the through-holes 26 of the main circuit board 15 are engaged with the positioning cylindrical portions 24, the through-holes 26 of the main circuit board 15 can be concentrically positioned with respect to the screw holes 16 of the supports 11. When the screws 17 are screwed into the screw holes 16 via the through-holes 26, the main circuit board 15 can be fixed to a reverse face of the backlight chassis 6.

Since the digital circuit board 18 is fixed to the reverse face of the backlight chassis 6 by the same procedure, like reference characters are used to indicate like parts and the procedure of fixing the digital circuit board 18 is omitted here.

According to the above structure, in order to fix the main circuit board 15 and the digital circuit board 18 to the backlight chassis 6, drawing is conducted on the backlight chassis 6 so that the supports 11 of only one type can be formed. Therefore, compared with the conventional structure in which the supports 11, 12 (shown in FIGS. 6 to 11) of a plurality of types are formed, the machining does not take much labor and the manufacturing cost can be reduced.

Since only drawing is conducted on the backlight chassis 6 and no cutout holes 20 (shown in FIG. 7) are formed on the backlight chassis 6 by raising, there is no possibility of the leakage of light G emitted by the backlight 3 leaks out backward. Accordingly, unlike the conventional structure, it is unnecessary to stick the shading sheet 22 (shown in FIGS. 10 and 11) to the backlight chassis 6. Therefore, the number of parts can be decreased. Further, labor to stick the shading sheet 22 onto the backlight chassis 6 can be eliminated and the manufacturing cost can be reduced.

Further, only when the through-holes 26 of the main circuit board 15 and the digital circuit board 18 are is engaged with the positioning cylindrical portions 24 formed at the top-face centers of the appropriate supports 11, the through-holes 26 of the circuit boards 15, 18 can be concentrically positioned with respect to the screw holes 16 of the supports 11 and the to screws 17 can be smoothly screwed into the screw holes 16 via the through-hole 26.

In the embodiment described above, explanations are made into a desktop type television set which is taken up as an example. However, it should be noted that the present invention is not limited to the above specific embodiment. For example, the present invention can be applied to a liquid crystal module which is used for a wall-mounted television set or a monitor for personal computer use.

In the embodiment, the backlight chassis 6 is described to have no cutout holes 20 formed thereon. S However, the backlight chassis 6 may include a cutout hole that is formed by raising.

Although the present invention has been shown and described with reference to the embodiment, various changes and modifications will be apparent to those skilled in the art from the teachings herein. Such changes and modifications as are obvious are deemed to come within the spirit, scope and contemplation of the invention as defined in the appended claims.

What is claimed is:

1. A liquid crystal module comprising:

a rectangular-frame-shaped mold frame that is provided with a backlight therein;

a liquid crystal cell that is arranged on a front face of the mold frame and is illuminated from a rear side by the backlight;

a backlight chassis that is made of metal and fixed on a rear face of the backlight via a reflecting sheet made of synthetic resin;

a plurality of supports that are formed on the backlight chassis; and a circuit board that is fixed to the supports by screwing, wherein the support is formed in a top-cut conical shape by swelling the backlight chassis backward by being subjected to drawing, wherein the supports are grouped into one of a first support and a second support, wherein the first support is formed with a positioning cylindrical portion protruding outward at a top face center thereof, wherein the second support is formed with a fixing cylindrical portion protruding inward at a top face center thereof by burring, wherein the positioning cylindrical portion and the fixing cylindrical portion are provided with a screw hole on an inner circumferential face thereon, and wherein the circuit board is fixed to a reverse face of the backlight chassis by positioning the circuit board by engaging the positioning cylindrical portion to a through-hole formed on the circuit board to concentrically positioning the through-hole to the screw hole, and by screwing a screw into the screw hole.

2. A liquid crystal module comprising:

a rectangular-frame-shaped mold frame that is provided with a backlight therein;

a liquid crystal cell that is arranged on a front face of the mold frame and is illuminated from a rear side by the backlight;

a backlight chassis that is made of metal and fixed on a rear face of the backlight via a reflecting sheet made of synthetic resin;

a plurality of supports that are formed on the backlight chassis; and a *first* circuit board that is fixed to the supports by screwing, wherein the support is formed in a top-cut conical shape by swelling the backlight chassis backward by being subjected to drawing, *and*

*wherein the first circuit board is arranged on the plurality of supports only.*

3. The liquid crystal module according to claim 2, wherein the supports are grouped into one of a first support and a second support, wherein the first support is formed with a positioning cylindrical portion protruding outward at a top face center thereof, wherein the second support is formed with a fixing cylindrical portion protruding inward at a top face center thereof by burring, wherein the positioning cylindrical portion and the fixing cylindrical portion are provided with a screw hole on an inner circumferential face thereon, and wherein the *first* circuit board is fixed to a reverse face of the backlight chassis by positioning the *first* circuit board by engaging the positioning cylindrical portion to a through-hole formed on the *first* circuit board to concentrically positioning the through-hole to the screw hole, and by screwing a screw into the screw hole.

*4. The liquid crystal module according to claim 2,*

*wherein the support comprises opening at a top face of the support, and*

*wherein the first circuit board is fixed by a screw through the opening.*

*5. The liquid crystal module according to claim 2, wherein the plurality of supports comprises one or more first supports and one or more second supports of which a shape is different from a shape of the first support.*

*6. The liquid crystal module according to claim 2, wherein the first circuit board contacts with a top face of the support.*

*7. The liquid crystal module according to claim 2,*

*wherein the support comprises a protruding portion at a top face of the support, and*

*wherein the first circuit board contacts with the protruding portion.*

*8. The liquid crystal module according to claim 2,*

*wherein the support comprises a protruding portion at a top face of the support, and*

*wherein the first circuit board comprises opening inserted by the protruding portion.*

*9. The liquid crystal module according to claim 2,*

*wherein at least one of the plurality of supports comprises a protruding portion at a top face of the support, and*

*wherein the first circuit board contacts with the protruding portion.*

*10. The liquid crystal module according to claim 9, wherein the at least one of the plurality of supports comprising the protruding portion is disposed near an end portion of the first circuit board.*

*11. The liquid crystal module according to claim 7,*

*wherein the protruding portion comprises opening, and*

*wherein the first circuit board is fixed by a screw through the opening.*

*12. The liquid crystal module according to claim 9,*

*wherein two of the plurality of supports comprise a protruding portion at a top face of the support, and*

*wherein the two supports are disposed near one of side edges of the first circuit board.*

*13. The liquid crystal module according to claim 2, further comprises:*

*a second circuit board,*

*wherein the second circuit board is disposed on a plurality of supports formed in a top-cut conical shape.*

*14. The liquid crystal module according to claim 13, wherein the second circuit board is a digital circuit board.*

*15. The liquid crystal module according to claim 13, wherein the first circuit board is a main circuit board.*

*16. The liquid crystal module according to claim 13, wherein the first circuit board and the second circuit board are disposed on a same plane.*

*17. The liquid crystal module according to claim 13, wherein a size of the first circuit board is larger than a size of the second circuit board.*

*18. The liquid crystal module according to claim 17, wherein a number of the supports on which the first circuit board is disposed is larger than a number of the supports on which the second circuit board is disposed.*

*19. The liquid crystal module according to claim 2, wherein the support is formed on a plane of the backlight chassis that is approximately parallel to a display surface of the liquid crystal cell.*

*20. The liquid crystal module according to claim 2, wherein holes formed by raising does not exist between the reflecting sheet and the first circuit board.*

*21. The liquid crystal module according to claim 2,*

*wherein the support comprises a cylindrical portion protruding from an opposite face of a top face of the supports,*

*wherein the first circuit board is fixed by a screw through the cylindrical portion.*

* * * * *